June 8, 1965  R. S. LOGAN  3,188,183
REACTOR FOR MIXING REACTIVE FLUIDS
Filed June 12, 1961  3 Sheets-Sheet 1

INVENTOR.
R.S. LOGAN
BY Hudson and Young
ATTORNEYS

INVENTOR.
R.S. LOGAN
BY Hudson and Young
ATTORNEYS

INVENTOR.
R. S. LOGAN
BY Hudson and Young
ATTORNEYS

United States Patent Office 3,188,183
Patented June 8, 1965

3,188,183
REACTOR FOR MIXING REACTIVE FLUIDS
Richard S. Logan, Bartlesville, Okla., assignor to Phillips Petroleum Company, a corporation of Delaware
Filed June 12, 1961, Ser. No. 116,583
5 Claims. (Cl. 23—285)

This invention relates ot the mixing of reactive fluids wherein rapid and thorough mixing is required to obtain the maximum benefit from the reaction of the fluids. In one aspect this invention relates to the rapid and intimate mixing of two immiscible and reactive liquids without appreciable introduction of mechanical heat. In another aspect the invention relates to an apparatus for the rapid and intimate mixing of two reactive liquids without adding appreciable heat to the resulting mixture and with a minimum of pressure drop through the mixing device.

It is well known that oil-soluble metal petroleum sulfonates have been used in imparting detergent properties to mineral lubricating oils. The petroleum fraction sulfonated, however, has usually been an unrefined oil, often having a naphthenic base, of about 300 to about 500 molecular weight. It has recently been discovered that metal petroleum sulfonates made from highly refined, paraffinic, high molecular weight fractions such as that represented by a dewaxed, solvent refined bright stock having a viscosity of about 200 SUS at 210° F., having a molecular weight of about 600 to 800 and having a viscosity index of about 85 to 95 or higher, produce a metal petroleum sulfonate having detergent properties not obtainable when using other petroleum fractions as the sulfonation stock. Such metal petroleum sulfonates and a process for their production are described in U.S. Patent 2,884,445, issued April 28, 1959, to W. N. Axe et al.

In the preparation of the metal petroleum sulfonates as described in the above patent, it is necessary that the hydrocarbon fraction and the sulfonation agent be thoroughly and rapidly admixed in order to obtain the maximum benefits from the sulfonation reaction. In a commercial scale operation it was found that the available prior art mixing devices did not provide adequate mixing to obtain the maximum benefits of the sulfonation reaction.

It is therefore a principal object of the present invention to provide means for the rapid and thorough mixing of a liquid petroleum hydrocarbon and a sulfonation agent in the sulfonation of petroleum hydrocarbons. It is also an object of this invention to provide a method for mixing two reactive and immiscible liquids so that the reactants pass through the mixing zone in the form of a mechanically agitated flow stream with a minimum of back mixing and pressure drop and a minimum of centrifugal force. It is still another object to provide a method for mixing two reactive and immiscible liquids by passing the liquid simultaneously through a zone wherein the liquids are subjected to a maximum of mechanical shear and with a minimum of resistance to flow through the mixing zone. A further object of the invention is to provide a device for the intimate and rapid mixing of two fluids by subjecting the fluids to a high degree of mechanical shear with only a sufficient degree of change of direction of the flow of fluids to accomplish uniform mixing of the body of fluids flowing through the device. Other and further objects and advantages of the invention will be apparent to one skilled in the art upon study of the disclosure of the present invention including the appended drawing wherein:

Figure 1:
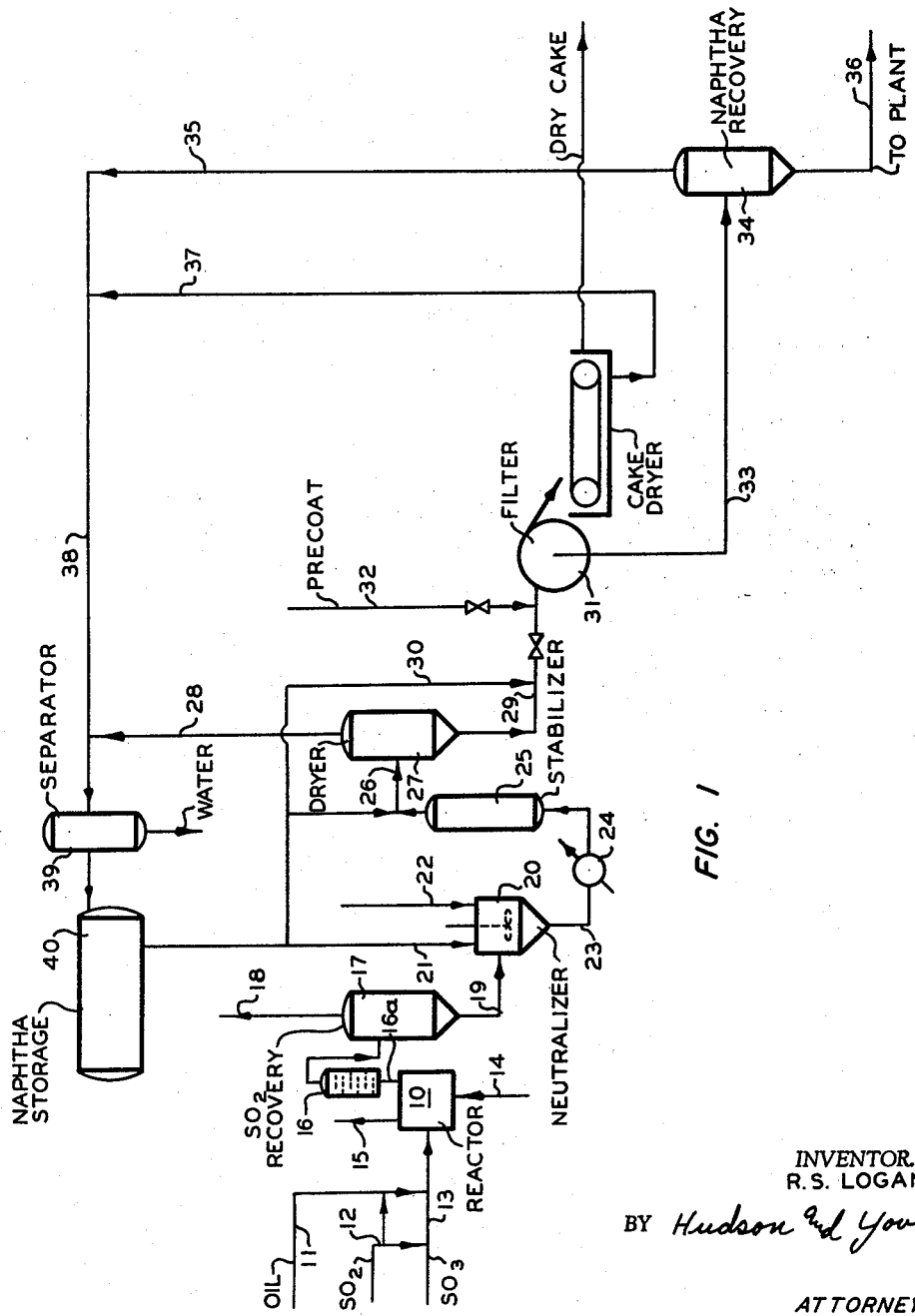
FIGURE 1 is a schematic flow diagram of a plant for producing petroleum sulfonate wherein the reactor of the invention is utilized.

Referring now to FIGURE 1, oil, a petroleum hydrocarbon fraction as hereinbefore described, sulfur dioxide ($SO_2$) and sulfur trioxide ($SO_3$) are introduced to reactor 10 via conduits 11, 12 and 13, respectively. The oil is preferably saturated with $SO_2$. Cooling water is introduced to the indirect heat exchange jacket of reactor 10 via conduit 14 and is removed therefrom via conduit 15. The effluent from reactor 10 is passed to time tank 16 for completion of the reaction and thence to flash tank 17 where $SO_2$ is vaporized and removed via conduit 18 for reuse. The substantially $SO_2$-free reaction product is then passed via conduit 19 to neutralizer 20 wherein the reaction product is admixed with naphtha introduced via conduit 21 and an aqueous slurry of lime ($Ca(OH)_2$) introduced via conduit 22. The slurry of reaction product, naphtha, lime and water removed from neutralizer 20 is passed via conduit 23 and heater 24 to stabilizer 25 for completion of the neutralization reaction. The neutralized slurry is passed via conduit 26 to dryer tower 27 where water, as an azeotrope with naphtha, is removed overhead via conduit 28. The dryer tower bottoms are removed via conduit 29, diluted with naphtha via conduit 30 and passed to precoat filter 31 for removal of lime and other inorganic solids such as calcium sulfate. The filter 31 is precoated with filter aid introduced via conduit 32 periodically as is conventional with precoat filters. The dried sulfonate, diluted with naphtha, is removed from the filter via conduit 33 and passed to stripper 34. Naphtha is removed from stripper 34 via conduit 35. Petroleum sulfonate as finished product is removed from naphtha stripper 34 via conduit 36. Naphtha is recovered from drying the filter cake and is passed via conduit 37 to conduit 38. Naphtha in conduits 28, 35 and 37 is passed via conduit 38 to separator 39, where water is removed, and then to naphtha storage 40.

Figure 2:
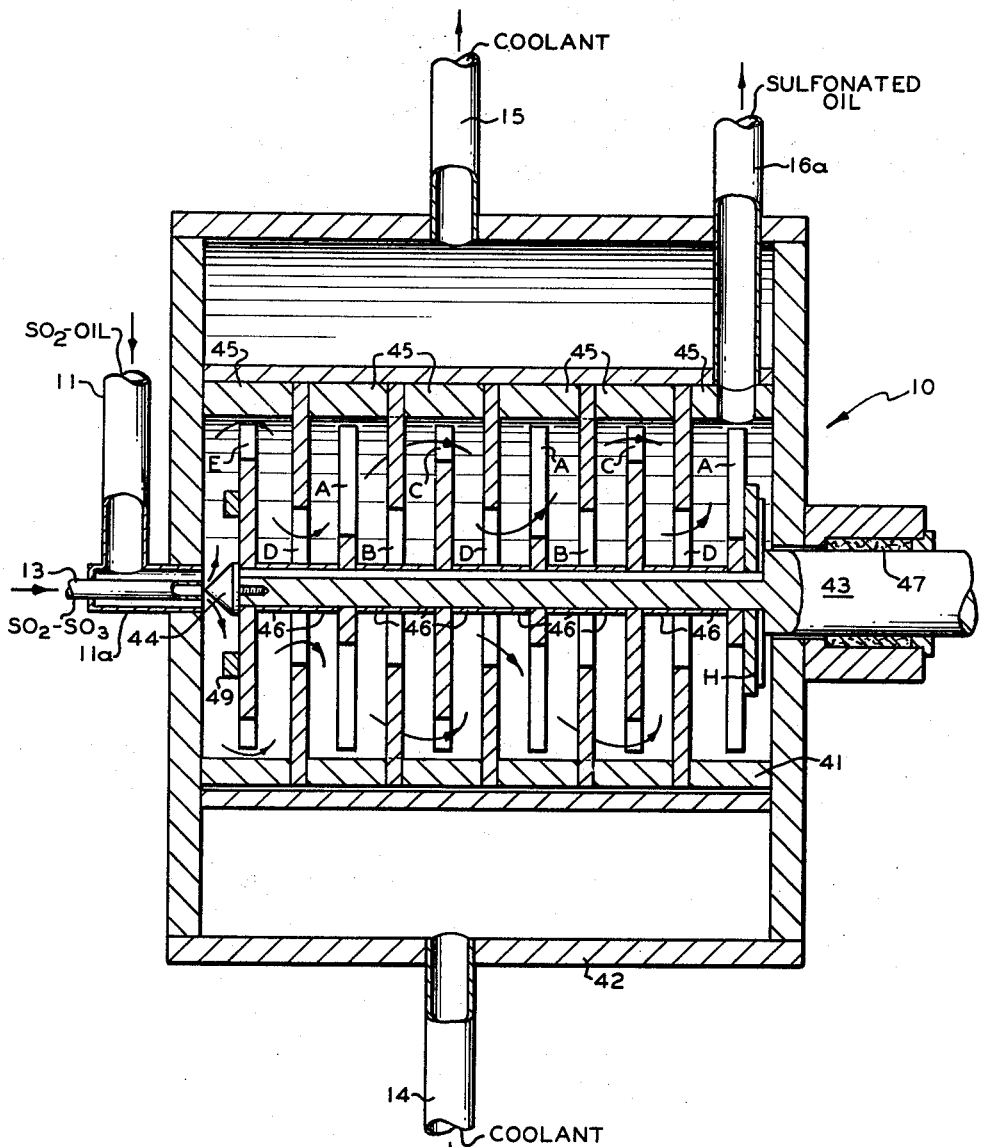
FIGURE 2 is an elevational view, in cross-section, of the reactor of the invention.

FIGURE 2 is a cross-sectional view of the reactor 10 of FIGURE 1. The reactor case 41 is enclosed by a water jacket 42 having inlet 14 and outlet 15. Reactant oil is introduced to the reactor via conduits 11 and 11a and the sulfonating agent, comprising $SO_3$ diluted with $SO_2$ is introduced axially through conduit 11a via conduit 13. Shaft 43 extends axially through the substantially cylindrical reactor 10 and terminates adjacent the inlet ports of conduits 11a and 13. The shaft 43 terminates in a conical impingement surface 44 adjacent to and coaxial with the inlet ports of conduits 11a and 13.

Mounted upon the shaft 43 are rotating blades E, A, C, and H. The shaft 43 is splined so that the blades are secured upon the shaft 43 by one or more keys. The configuration of each of the various blades is described later in the description of FIGURES 3, 4, 5 and 8.

Stationary baffles D and B are secured to the reactor case 41 by keys positioned in keyways in the case and in the baffles and are maintained in proper spaced relationship to the blades on the shaft 43 by spacers indicated at 45. The blades are maintained in spaced relationship on the shaft 43 by spacers indicated at 46. The shaft 43 is rotated by a power source such as an electric motor (not shown) and the materials are prevented from leaking around shaft 43 by a conventional packing gland 47. The mixed reaction products are removed from the reactor via conduit 16a.

Figure 3:
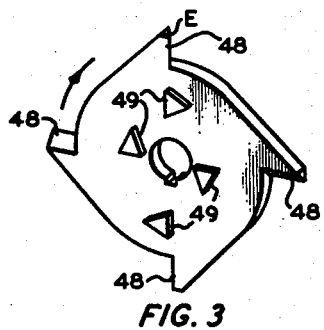
FIGURES 3-8 are perspective views of the various elements within the reactor of FIGURE 2.

Blade E is shown in FIGURE 3. The blade has sharpened leading edges indicated at 48 and has, secured to its face adjacent the feed inlet, triangular shaped lugs 49 to introduce a degree of turbulence to the combined stream of oil and $SO_2=SO_3$ flowing over impingement plate 44 and the face of blade E.

Figure 4:
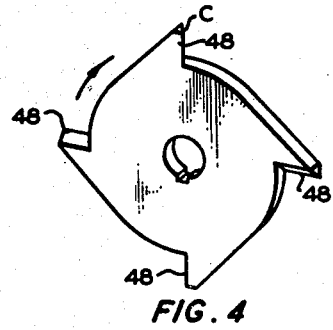
Figure 5:
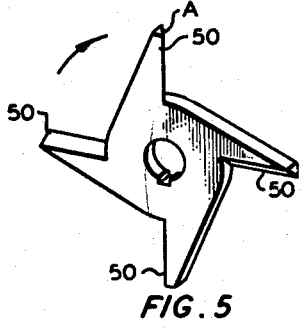

FIGURE 4 shows the configuration of blades C which are substantially identical to blade E except that the lugs 49 are not utilized on the blades C. FIGURE 5 shows the configuration of blades A which have sharpened leading edges 50.

The disc portion of blade A is smaller than that of blades C and E so that a greater amount of cutting edge is exposed. The disc portion of blades C and E occupies more than about 50 percent of the cross-sectional area of the reactor whereas the disc portion of blades A occupies less than about 50 percent of the cross-sectional area of the reactor. It should be noted that the leading edges 48 and 50 are sharpened on alternate faces of the blade.

Figure 6:
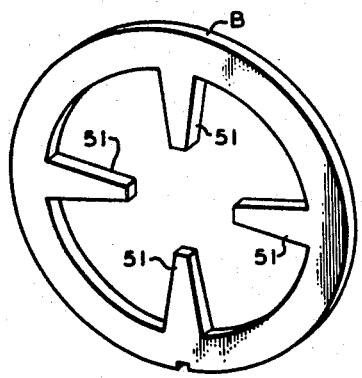
Figure 7:
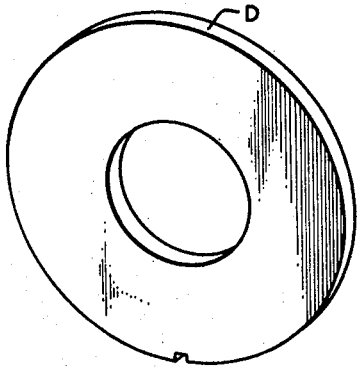

The baffle B shown in FIGURE 6 is open at the center and also at the periphery whereas the baffle D is open only at the center. The segments 51 of baffle B, which resemble spokes of a wheel, act somewhat as straightening vanes for the flow of fluid and tend to discourage the setting up of centrifugal forces in the flowing fluid stream.

Figure 8:
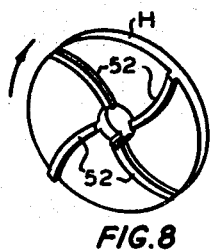

The baffle plate H of FIGURE 8 has a plurality of ridges 52 radiating from the center and acts somewhat as a turbine blade to reduce the fluid pressure packing of seal 47.

The flow pattern of the fluid mixture through the reactor is indicated by the arrows. It should be noted that the fluid is alternately forced toward the axis of the reactor and toward the periphery of the reactor. This continuous change of direction discourages the setting up of centrifugal force and also improves mixing by presenting new surfaces to the shearing action of the rotating blades.

The following specific example will be helpful in attaining an understanding of the invention although this example is not to be construed as limiting the invention.

The process of sulfonating a lube oil fraction with a mixture of $SO_3$ and $SO_2$, as illustrated in FIGURE 1 of the drawing, was practiced with a commercially available mixer as the reactor. In order to produce the desired yield of sulfonic acid in this reactor it was necessary to utilize an $SO_3$-to-oil ratio of 0.115 which is about 30 percent more than the ratio of 0.080 which tests had indicated was required. The mixer was replaced with a different type of commercially available mixer and substantially the same results were obtained.

A mixer according to the present invention was then substituted for the commercially available mixer in the process and the $SO_3$-to-oil ratio was reduced to 0.082 with no reduction in yield of sulfonic acid. This represents an appreciable savings of $SO_3$. In addition, the total acidity of the reaction product was substantially reduced, thus reducing the quantity of calcium hydroxide (lime) required and also reducing the calcium sulfate content of the feed to the filter.

An $SO_3$-to-oil ratio of 0.086 or higher often results in undesirable reaction products, probably oxidation products, which adversely affect the color and viscosity of the sulfonate product. Extended mixing time can also produce undesirable reaction products and therefore back mixing, which is a form of internal recycle, can adversely affect the metal petroleum sulfonate product. Although some side reactions, such as oxidation, no doubt occur with all $SO_3$-to-oil ratios these side reactions are minimized by maintaining the $SO_3$ content of the mixture at a value below about 0.086. The reactor of this invention provides a means for producing satisfactory yields of product at the required low $SO_3$-to-oil ratios.

The mixing chamber of the reactor was about 8¾" long and about 6" in diameter and the shaft was ¾" in diameter. The disc portion of blades A was 2¼" in diameter and from blade tip to opposite blade tip was 5¼". The disc portion of blades C and E was 3¾" in diameter and from blade tip to opposite blade tip was 5¼". The center opening in baffles D was 2¼" in diameter.

The baffles and blades were spaced ½" apart by means of the spacers 45 and 46 which were 1¼" in length. The blades and baffles were each ¼" in thickness.

In the sulfonation process the shaft was rotated at about 2400 r.p.m. and the pressure maintained on the reactor contents was sufficient to maintain the $SO_2$ in liquid phase, i.e., about 150 p.s.i.g. The reactor can be operated at any desired speed; speeds will usually be between 1800 and 3000 r.p.m. The quantity of material passed through the reactor in the above runs was from about 1350 to 4050 pounds per hour; however, the throughput can be varied to suit the particular process or demand. The materials which made up the 1350 pounds per hour included 750 pounds of oil, 540 pounds of $SO_2$ and 60 pounds of $SO_3$. The materials which made up the 4050 pounds per hour included 2250 pounds of oil, 1620 pounds of $SO_2$ and 180 pounds of $SO_3$. Intermediate quantities were substantially in the same proportions.

A reactor, or mixer, constructed according to the invention, having blades and baffles ⅛" in thickness and spaced ½" apart was also utilized in the sulfonation reaction with a satisfactory, low $SO_3$-to-oil ratio of about 0.080.

In order to achieve maximum mixing of the immiscible fluids with a minimum of mechanical heat being generated from shear of the fluids by the blades and baffles, it is important that the clearance between the blades and baffles be fixed properly. In general, the minimum allowable distance between the blades and baffles will be between about $\frac{1}{16}$" and 1" and will be determined by the viscosity of the fluid mixture.

In the above runs the oil saturated with $SO_2$ fed to the reactor had a viscosity of about 400 centipoises at 70° F. and the $SO_3$-$SO_2$ mixture had a viscosity of about 0.6 centipose at 50° F. The total reactor effluent had a viscosity of about 35 centipoises at 110° F.

The total number of blades and baffles in the reactor, or mixer, can be increased or decreased so long as the flow pattern, e.g., alternately toward the axis of the stream and toward the periphery of the stream, is not materially altered.

That which is claimed is:

1. A reactor for intimately and rapidly contacting two fluids which comprises a tubular chamber having a closure at each end thereof; an inlet port centrally located in one end closure of said chamber; a first conduit connected to said inlet port to provide a nozzle to introduce one of said fluids; a second conduit coaxially positioned within said first conduit and terminating in a nozzle at said inlet port to introduce the other of said fluids; an outlet port in the periphery of said chamber at the end of said chamber opposite said inlet port; a rotatable shaft centrally mounted in the end closure opposite said inlet port, extending coaxially through said chamber, and terminating in a solid conical end with its apex adjacent said inlet port; a plurality of stators spaced apart over the longitudinal length of said chamber extending from the chamber wall, alternate stators comprising a plurality of triangles with the bases secured to the chamber wall; a plurality of rotors fixedly mounted on said shaft and spaced between said stators, each rotor having blade sections extending the same distance from said shaft and having hub sections extending so as to occupy alternately more than and less than about 50 percent of the cross-sectional area of said chamber, said stators and rotors being relatively thin in cross-section with respect to their length; and a sealing means between said shaft and said closure opposite said inlet port.

2. The reactor of claim 1 wherein a rotor is positioned on said shaft adjacent said sealing means with a plurality of ridges radiating from the center of the surface adjacent said sealing means.

3. The reactor of claim 1 wherein a jacket, having an inlet and an outlet, encloses said chamber.

4. The reactor of claim 1 wherein the rotor adjacent said inlet port has a plurality of lugs attached to the rotor surface next to said inlet port.

5. A reactor for intimately and rapidly contacting two liquids which are reactive to each other comprising a tubular chamber having a closure at each end thereof; an inlet port centrally located in one end closure of said chamber; a first conduit connected to said inlet port externally of said chamber; a second conduit coaxially positioned within said first conduit and terminating in a nozzle at said inlet port; an outlet port in the periphery of said chamber at the end opposite said inlet port; a rotatable shaft centrally mounted in the end closure opposite said inlet port, extending coaxially through said chamber, and terminating in a solid conical end member with its apex adjacent and spaced from said inlet port; a plurality of stators spaced apart over the longitudinal length of said chamber and being alternately open at about the periphery and about the axis of said chamber so as to form alternate zones of compression and expansion; a plurality of rotors fixedly mounted upon said shaft and spaced apart so that said rotors are positioned between stators, said rotors having blade sections extending the same distance from said shaft and having hub sections extending so as to occupy alternately more than and less than about 50 percent of the cross-sectional area of said chamber to co-operate with said stators in forming alternate zones of compression and expansion; and a disc rotor adjacent the end closure opposite said inlet port having a plurality of backwardly curving, spiraliform ridges on the surface adjacent said end closure radiating outwardly from said shaft so as to reduce the chamber pressure at the shaft adjacent said end closure.

References Cited by the Examiner
UNITED STATES PATENTS

| | | |
|---|---|---|
| 2,169,338 | 8/39 | Ditto. |
| 2,350,095 | 5/44 | Carlson et al. _____ 23—252 X |
| 2,828,331 | 3/58 | Marisic et al. _____ 260—504 |
| 2,832,574 | 4/58 | Ranzenberger _____ 23—285 |
| 2,903,344 | 9/59 | Rollman et al. _____ 23—285 |
| 2,909,563 | 10/59 | Whitney _____ 260—504 |
| 2,944,877 | 7/60 | Marco _____ 23—290.5 |

MORRIS O. WOLK, *Primary Examiner.*

LEON ZITVER, JAMES H. TAYMAN, Jr., *Examiners.*